United States Patent [19]

Andrenacci et al.

[11] Patent Number: 5,786,053
[45] Date of Patent: Jul. 28, 1998

[54] SUPERIMPOSED COVERINGS HAVING INCREASED STABILITY

[75] Inventors: Alfredo Andrenacci, Toronto; Michael A. Romano, Dundas; John H. Oliver, Huntsville, all of Canada

[73] Assignee: Shaw Industries, Ltd., Rexdale, Canada

[21] Appl. No.: 790,226

[22] Filed: Jan. 28, 1997

Related U.S. Application Data

[62] Division of Ser. No. 599,114, Feb. 9, 1996, Pat. No. 5,662,974, which is a continuation of Ser. No. 262,069, Jun. 17, 1994, abandoned.

[51] Int. Cl.$^6$ .................................................. B32B 7/12
[52] U.S. Cl. .................... 428/36.9; 428/36.91; 428/34.9; 428/57; 428/133; 428/194; 428/200; 428/349; 428/913; 138/146; 138/155; 174/DIG. 8
[58] Field of Search .................... 428/34.9, 35.1, 428/35.2, 57, 61, 192, 195, 343, 349, 913, 133, 194, 200; 138/155, 170, 98, 99, 141, 146; 174/DIG. 8

[56] References Cited

U.S. PATENT DOCUMENTS

| | | | |
|---|---|---|---|
| 4,472,468 | 9/1984 | Tailor et al. | 428/34.9 |
| 4,731,273 | 3/1988 | Bonk et al. | 428/34.9 |
| 5,134,000 | 7/1992 | Smythe et al. | 428/34.9 |
| 5,175,032 | 12/1992 | Steele et al. | 428/34.9 |
| 5,302,428 | 4/1994 | Steele et al. | 428/34.9 |
| 5,411,777 | 5/1995 | Steele et al. | 428/34.9 |

FOREIGN PATENT DOCUMENTS

| | | |
|---|---|---|
| 0309597 | 4/1989 | European Pat. Off. |
| 1529246 | 6/1968 | France. |
| 870165 | 6/1961 | United Kingdom. |
| 1078559 | 8/1967 | United Kingdom. |
| WO 90/12235 | 10/1990 | WIPO. |

*Primary Examiner*—Rena L. Dye
*Attorney, Agent, or Firm*—Dickinson Wright PLLC

[57] ABSTRACT

An article, for example a pipe, has a first covering such as a polymer layer, and a second covering, such as a repair patch or a repair deposit of melt-on adhesive or a wrap or a sleeve protecting a welded joint between two lengths of such pipe. The second covering may have a functional coating on an underside which is applied on and is at least partially superimposed over the first covering. A cured deposit of thermoset resin is applied at least over the edges of the second covering, for example in the form of a fibrous tape impregnated with a curable resin composition, and bonds to the first and second coverings. The resin deposit provides the second covering with increased stability against displacement laterally of said first covering, for example as a result of soil stress.

29 Claims, 2 Drawing Sheets

SUPERIMPOSED COVERINGS HAVING INCREASED STABILITY

This application is a division of U.S. patent application Ser. No. 08/599,114, filed Feb. 9,1996, now U.S. Pat. No. 5,662,974, which was a continuation of U.S. patent application Ser. No. 08/262,069, (abandoned) filed on Jun. 17, 1994.

BACKGROUND OF THE INVENTION

It is known to provide articles such as telephone cables, electrical cables, pipelines and the like with a protective covering for sealing and protecting them from adverse conditions such as corrosion and moisture. For example, pipes for pipelines may be provided with an extruded thermoplastic coating, or with a fusion bonded coating.

It is also often desired to provide a second covering having a functional coating on its underside at least partially superimposed on the first-mentioned covering. For example, sometimes the pipeline coating may have a hole or holiday therein which may be patched by applying a covering piece having a functional coating on its underside. As a further example, usually the ends of the pipes are left bare of protective coating to facilitate welding, and this bare section is protected subsequent to welding with a heat shrinkable sleeve, either a cylindrical sleeve or more usually a wrap-around sleeve, which has a functional coating on its inner side and that is shrunk down tightly in contact with the exposed metal and having its ends overlapping the coatings of the adjacent pipe sections.

The lateral stability of the superimposed coverings is not always as great as may be desired, especially when exposed to soil stress. Such soil stress may be encountered by a pipeline or other buried article when the article moves bodily through the soil as a result of, for example fluctuations in the temperature of the conveyed fluid.

It is known to use mastics as the functional coating. The term "mastics" is used herein in the sense in which it is understood by those skilled in the art. As understood by those skilled in the art mastics are generally pressure-sensitive adhesive materials which are somewhat soft and gum-like in nature, and which maintain these properties over a wide range of temperatures. The mastics provide good water resistance, ease of application and less sensitivity to ambient temperature during application but exhibit low shear strengths and poor resistance to soil stress. It is also known to use hot melt adhesives as the functional coatings, or hybrids which combine the properties of mastics and hot melt adhesives. The term "hot melt adhesives" is used herein in the sense in which it is understood by those skilled in the art. As known by those skilled in the art hot melt adhesives are adhesive materials typically having little or no surface tack at working temperatures, but rather relying on having previously achieved a high interface temperature to flow and form a bond with the substrate. Generally, the hybrids and hot melt adhesives have lower water resistance and greater difficulty of application and greater temperature sensitivity than the mastics, but have higher shear strengths and increased resistance to soil stress. However, the resistance to soil stress of even the hybrids and hot melts may still not be as great as is desirable.

SUMMARY OF THE INVENTION

The present invention provides an article having superimposed coverings providing increased stability, and especially considerably increased stability and resistance to soil stress, comprising an article having a first-covering thereon, a second covering at least partially superimposed over the first covering, said second covering having edges, and a cured deposit of thermoset resin applied at least over said edges of the second covering and bonding to said first and second covering and providing the second covering with increased stability against displacement laterally of said first covering.

In one embodiment, the second covering has a functional coating on an underside applied on the first covering. In one especially advantageous form, the functional coating is a mastic which provides excellent water resistance and ease of application. This allows the advantages of the use of mastics to be attained while providing resistance to soil stress which can be greater than that achievable with hybrid or hot melt adhesives by themselves In other embodiments, the second covering may comprise an adhesive, for example a hot melt adhesive.

BRIEF DESCRIPTION OF THE DRAWINGS

The invention will now be more fully described by way of example only with reference to the accompanying drawings.

DETAILED DESCRIPTION

Figure 1:
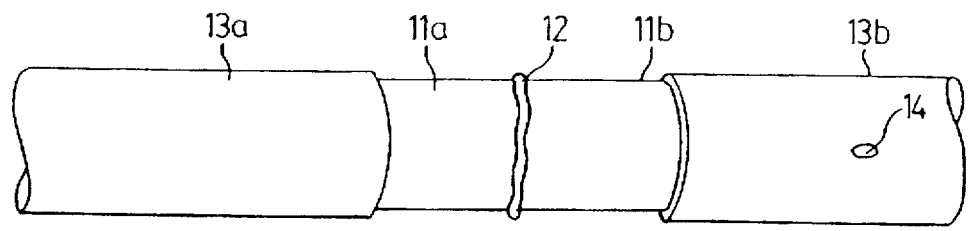
FIG. 1 shows a perspective view of a pipeline in the region of a weld between two adjacent pipe sections.

Referring to the drawings, wherein like references indicate like parts, FIG. 1 shows a portion of a pipeline comprising pipes 11a and 11b, the ends of which have been welded together along a weld area 12. Each pipe section 11a and 11b has been provided with a protective coating 13a and 13b, respectively, which covers the pipe 11a or 11b along its entire length except for a short section exposed at each end of the pipe to permit the above mentioned welding operation.

The nature of the protective coating 13a or 13b is not particularly critical to the present invention, and it is contemplated that the present invention may be applied in conjunction with any of the known forms of protective coating provided that it is possible for the curable thermosetting composition, as described in more detail below, to form a bond of acceptable strength to such protective coating. Merely by way of example, the coating 13a and 13b may be a plastics composition. For example, it may comprise a thermoplastic such as a polyolefin. The coating may, for example, be applied by extrusion onto the pipe surface, or in the form of a particulate coating which is then treated, for example by heating, to fusion bond the composition and coalesce the particles to form a continuous layer on the pipe surface. Examples of various suitable pipe coating are disclosed in, for example, U.S. Pat. Nos. 4,752,497 (McConkey et al), 4,990,383 (Bergstrom et al) and 5,026,451 (Trzecieski), the disclosures of all of which are incorporated by reference herein.

It may be noted that, in the example shown in FIG. 1, the coating 13b has a defect or holiday 14 therein.

Figure 2:
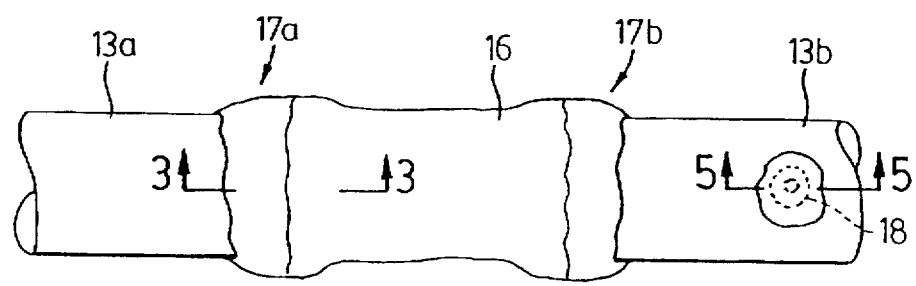
FIG. 2 is a perspective view of the pipeline of FIG. 1 having a superimposed sleeve and a superimposed patch in accordance with the invention.

Referring to FIG. 2, this shows the pipe of FIG. 1 after a protective covering 16 has been applied over the pipe weld area 12. The covering 16 is of sufficient length that it overlaps at each end on the coatings 13a and 13b, as seen in cross-section in FIG. 3. The covering 16 may, for example, be formed by applying, in the cold, conventional pressure sensitive adhesive-backed tapes or wraps, or may for example, comprise a heat shrinkable sleeve comprising a heat shrinkable backing 16a provided on its underside with a functional coating 16b which is typically a sealant or adhesive. In the course of installation, the backing 16a is heated so that it shrinks down tightly onto the pipe surfaces 11a and 11b. Usually, the fluidity and tackiness of the functional coating increase as the backing 16a becomes hotter, so that the functional coating tends to wet and coat the exposed surfaces of the metal pipes 11a and 11b and form a tight seal on the adjacent ends of the coatings 13a and 13b. The intimacy of the contact between the functional coating material 16b and the underlying surfaces is enhanced by the hoop stress imparted by the sleeve backing 16a as it shrinks down. Such sleeve 16 may be of the cylindrical or wrap-around type. Many forms of heat shrinkable sleeve are known to those of ordinary skill in the art, and it is contemplated that the present invention may be used with all such sleeves. Merely by way of example, various forms of backing and functional coating are described in U.S. Pat. Nos. 4,472,468 (Tailor et al), 5,134,000 (Smythe et al) and 5,175,032 (Steele et al), as well as in pending U.S. patent application Ser. No. 07/660,866 filed Feb. 26, 1991 in the name Robert E. Steele et al. The above mentioned patents and application are incorporated herein by reference for their disclosures of suitable sleeves for use in connection with the present invention.

In preferred forms, for example, the backing sheet 16a comprises a cross-linked polyolefin sheet, composed primarily of blends of polyethylene with suitable copolymers such as, for example, poly(ethylene-vinyl acetate), poly(ethylene-ethyl acrylate), poly(ethylene-maleic anhydride) and poly (ethylene-vinyl acetate-maleic anhydride). Blends which aid in attaining adhesion to the curable thermosetting composition are preferred.

The functional coating 16b may, in preferred forms, comprise a mastic, hot melt adhesive or a hybrid thereof. These materials are well known to those of ordinary skill in the art, and need not be described in detail herein. Further, reference may be made to the above noted patents and application, incorporated by reference herein, for descriptions of such suitable functional coating materials.

In one especially preferred form of the present invention, the functional coating material 16b comprises a mastic. Usually, the mastic materials comprise substantially amorphous natural or synthetic polymers, or mixtures thereof, in contrast to the hot melt adhesive materials, which typically exhibit marked crystallinity.

Examples of typical mastic compositions include blends of substantially amorphous rubber materials, such as butyl rubber, natural rubber, latex SBR rubber, with tackifying resins, such as synthetic hydrocarbon tackifying resins, rosin ester tackifying resins, and inert fillers such as calcium carbonate, talc and carbon black, usually together with antioxidants, and with or without admixtures of other amorphous natural or synthetic polymers, such as asphalt, polybutene and amorphous polyolefins, such as amorphous polyethylene, styrene-isoprene copolymers, and liquid butyl polymers. Such mastic compositions provide excellent properties of excluding ingress of water to the sealed area, and, as compared with hot melt adhesive and other functional coating materials, exhibit lower and broader softening temperatures and substantial surface tack which contribute to considerably greater ease of application over a wide range of ambient temperature including very low ambient temperatures. However, the mastic materials exhibit low shear stress and are therefore especially prone to failure as a result of soil stresses imposed on the sleeve 16 as a result of bodily movement of the pipeline through the earth in which it is buried. In accordance with one preferred form of the present invention, increased stability of the sleeve with respect to soil or other stresses is achieved by application of thermoset resin 17 in the form of bands 17a and 17b extending around the ends of the covering such as backing sleeve 16a, and onto the adjacent surfaces of the coverings 13a and 13b.

Figure 3:
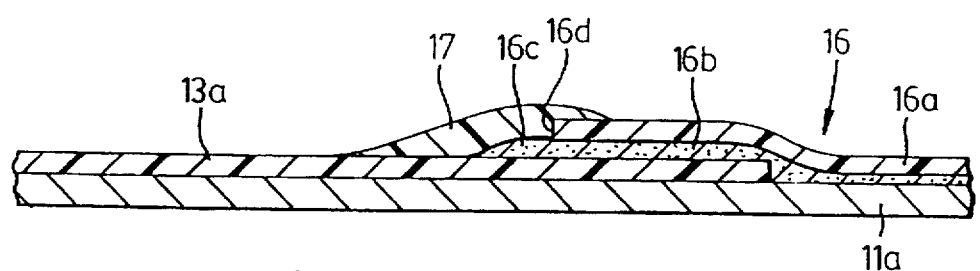
FIG. 3 is a cross-section on an enlarged scale taken on the line (3—3) in FIG. 2.

As indicated in FIG. 3, especially in the case in which the functional coating material 16b comprises a relatively soft material, the functional coating material may tend to be extruded outwardly from the edges of the backing sheet 16a, so that, after shrinking down of the backing sheet 16a, edge portion 16c of the functional coating material tapers outwardly in thickness from the end portions of the backing sheet 16a over the outer surface of the coverings 13a and 13b.

The curable composition is preferably applied, for example by brushing or spraying, in sufficient thickness so that, in the cured state, as seen in FIG. 3, the bands 17a and b of the cured deposit 17 extend continuously from the surface of the covering 13a or 13b continuously to at least the outer surface of the backing sheet 16a, and preferably above this surface, as seen in FIG. 3, so that, in effect, the cured deposit 17 forms a solid block or abutment extending over the full depth of the end surface 16d of the backing sheet 16a. Alternatively, the curable composition may be applied in the form of a tape of fibre mesh, weave or roving impregnated with the curable composition in uncured or partially cured (B-staged) form.

In the preferred form, the bands 17a and 17b allow the use of relatively softer and more pliable low density crosslinked polyolefins as the backing sheet 16a. The low density materials tend to expand in girth to a greater degree than the high density materials at elevated temperatures. Traditionally they have been avoided for sleeves subject to high service temperatures and soil stress, because the ends of the sleeve tend to expand and lift upwardly from the surface of the pipeline or other article and tend to admit moisture and soil. The bands 17a and 17b, however, can anchor the ends of the sleeve 16 and reduce or eliminate expansion of them so that the above problems can be avoided.

Further, in comparative testing of shrunk sleeves with and without thermoset resin end bands such as the bands 17a and 17b it has been found that the sleeves having the thermoset anchoring bands offer outstandingly greater resistance to soil stresses, even when the functional coating material 16b is a relatively soft mastic or the like, as compared with similar sleeve having hot melt adhesive functional coating without the thermoset external anchoring bands. Typically, the sleeve having the thermoset bands such as the bands 17a and b are capable of withstanding several hundreds of cycles of movement through soil, even where the pipe is maintained at elevated temperatures e.g. about 80° C. by circulation of heated fluid therethrough, whereas under such conditions similar known sleeves having hot melt adhesive functional coatings are substantially disrupted and destroyed.

Without wishing to be bound by any theory, it appears that the thermoset deposit 17 acts as a physical block or abutment, physically preventing lateral displacement of the edges of the backing sheet 16a relative to the covering 13a and the direction longitudinally of the pipe 11a.

In the preferred form, the thermoset material, in its cured condition exhibits a flexural modulus (as measured by ASTM D790) of at least about $10^3$ psi. Thermoset materials having a flexural modulus substantially less than about $10^3$ psi tend to have insufficient stiffness to withstand the pressures generated by gross soil movements. Generally speaking, the stiffer and harder the thermoset material is, the better it will withstand external stresses. However, the use of thermoset materials having a flexural modulus in excess of about $10^7$ psi does not appear to significantly increase the stability of the covering such as the sleeve 16, and may require use of thermosetting materials which are highly filled, excessively expensive and difficult to work with. More preferably, the flexural modulus is in the range about $10^4$ psi to about $10^6$ psi, still more preferably about $5\times10^4$ psi to about $7.5\times10^5$ psi.

Desirably, the thermoset material has a shear strength (as measured by ASTM D 1002) of at least about 250 psi at the maximum operating temperature which the coverings are destined to encounter when the covered article is in service. Materials having a shear strength significantly less than about 250 psi tend to have insufficient strength to withstand soil stresses such as may typically be encountered in pipeline service. The higher the shear strength, the better the material will perform, but the use of materials having shear strengths in excess of the shear strength of the bond between the thermoset deposit and the first covering (typically up to about 20,000 psi) do not contribute significantly to increased resistance to soil stresses, and may involve the use of highly reinforced or excessively expensive materials. More preferably, the shear strength at the maximum operating temperature is in the range about 500 to about 10,000 psi, still more preferably about 1000 to about 5000 psi.

Since, essentially, the present invention utilizes the physical properties of the thermoset material, the nature of the thermoset material is not especially critical provided that it forms a bond of sufficient strength to the first and second coverings to be able to resist peeling, shearing and other stresses in service so as to improve the stability of the second covering against displacement laterally relative to the first covering. The thermosetting material in its uncured condition should be sufficiently mobile or fluid, usually liquid or paste-like that it can be readily applied to provide the deposit having the required thickness along and preferably bridging over the edges of the covering 16 and the adjacent portions of the protective covering 13a and 13b. Desirably, the composition in its uncured state has a certain degree of thixotropy so that the applied composition does not tend to flow down to a lower portion of the pipeline surface before curing. If necessary or desirable, the thermosetting composition may be modified by addition of thixotroping agents, reinforcing fillers and the like.

If the thermosetting composition is applied in the form of an impregnated tape, the impregnation may take place prior to, during, or after wrapping. For example, the curable composition may be applied thickly to the appropriate regions and the fibrous tape applied over it, after which the liquid curable composition is worked into the tape. Alternatively, the tape may be saturated with the liquid curable composition, then wrapped over the appropriate regions. One particularly preferable method is to use a fibrous tape impregnated with a moisture-activated resin, such as for example Master Wrap, which is sold by Patchmasters International Inc. The tape is first soaked in water, then wrapped on in one or more layers, with cure taking about 1 hour. Another preferred product is a fibreglass tape impregnated with a partially cured (or "B-staged") resin. After wrapping, the tape is gently heated to effect final cure.

It is contemplated that any thermosetting composition which is sufficiently mobile and fluid in its uncured state for application in the manner above described, and which, in the cured condition has the hardness and shear strength discussed above, and which can practically be made to bond well to each of the substrates it contacts (for example substrates 13a, 16c and 16a in FIG. 3) may be used in the covering structures of the present invention. For example, thermosetting polyesters, polyurethanes, epoxy resins, silicone resins and polyurea resins may be employed. The presently preferred materials are epoxy resins based on bisphenol A-epichlorohydrins and cured with reactive hardeners such as primary or secondary amines. Other thermosetting compositions which may be used in the covering structures of the present invention will be readily apparent to those skilled in the art, and need not be described in detail herein. For example, U.S. Pat. No. 4,732,632 in the name Pieslak et al describe numerous epoxy resin compositions, and is incorporated herein for its disclosure of resin compositions suitable for use in the present invention. Generally, the thermosetting compositions will comprise two components, namely a resin composition and a hardener which are mixed together shortly before application. In the preferred form, the thermosetting resin composition is applied, for example by brushing or spraying, to form the bands 17a and 17b on the ends of the sleeve such as a sleeve 16 directly after heat shrinking of the sleeve, and while the sleeve is still hot, typically at a temperature of about 80° C., and is allowed to cure.

Figure 4:
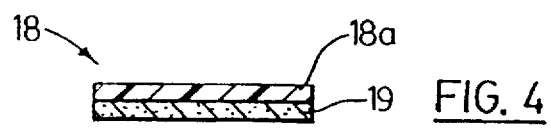
FIG. 4 is a cross-sectional view of a covering piece for use in forming the patch shown in FIG. 2.

FIG. 4 shows in cross-section a patch for use in sealing a holiday such as holiday 14 in a protective covering such as covering 13b, in the form of a backing sheet 18 and a functional coating 19 applied on one side thereof.

Preferably, the patch 18 is generally rounded in plan, for example is circular or oval, so that it does not present sharp discontinuities or corners which may tend to be especially vulnerable to uplifting or dislodging by soil stresses.

The backing sheet 18a may be formed of any flexible material having sufficient physical strength and chemical and moisture resistance, including any of the materials used for the backing sheet 16a as discussed above in connection with FIGS. 1 to 3. Normally the sheet 18a is substantially dimensionally heat stable, and is not heat shrinkable.

Figure 5:
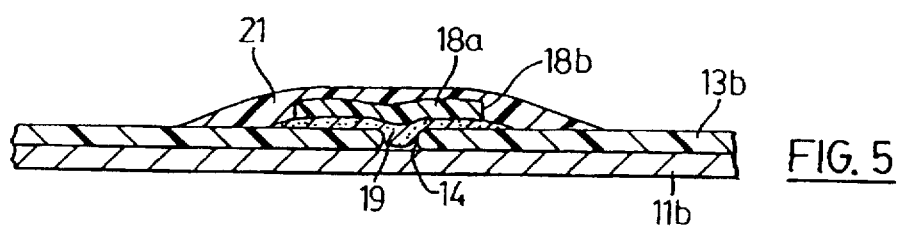
FIG. 5 is an enlarged cross-sectional view taken on the line 5—5 in FIG. 2.

Similarly, the functional coating 19 may be any of the functional coating materials as discussed above for use in connection with the functional coating 16b and the embodiment of FIGS. 1 to 3. Preferably, however, as with the embodiment of FIGS. 1 to 3, the functional coating 19 comprises a mastic with a relatively low softening temperature. In use, the patch 18 is applied over the holiday 14, and is heated, for example with a propane torch or the like, to soften the functional coating 19 and cause it to flow downwardly to at least partially fill the holiday 14, as seen in FIG. 5. Thereafter, to provide the patch with increased stability against displacement as a result of soil stress, a deposit of a thermosetting resin composition 21 is applied at least over the edges of the patch 18, and, preferably, as shown in FIGS. 2 and 5 over the whole of the patch 18. As seen in FIG. 5, desirably the margins of the cured deposit 21 around the edges of the patch 18 are at least of thickness to extend over the depth of the side surface 18b of the backing sheet 18a, in order to provide the physical blocking or abutment action to resist lateral displacement, as discussed above in connection with the embodiment of FIGS. 1 to 3. The thermoset resin 21 may be any of the materials discussed above in connection with the thermosetting resin deposit 17 of the embodiment of FIGS. 1 to 3, and may be applied and allowed to cure as discussed above.

The thermoset resin deposit 17 or 21 must bond securely to the upper surface of the coverings 13a or 13b, and also to the surfaces of the secondary or superimposed covering such as the backing sheet 16a of the sleeve 16 or upper sheet 18a of the patch 18. If necessary or desirable, the surfaces of the portions 13a, 13b, 16a and 18a may be flame-oxidized in order to render them chemically active and receptive to forming strong bonding forces with the thermosetting resin composition. Alternatively, the surfaces may be made similarly active and receptive by treating them with a primer such as those conventionally used to promote bonding of thermosetting resin compositions. For example, an acrylate polymer primer, or a solution of an EVA (ethylene vinyl acetate) copolymer may be used.

Figure 6:
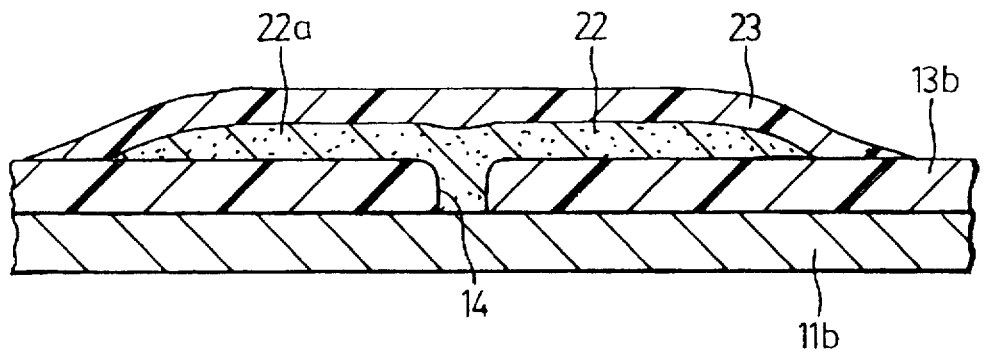
FIG. 6 is a cross-sectional view similar to FIG. 5 showing a coated pipe having a holiday and a repair thereto formed in accordance with the invention.

FIG. 6 shows a further embodiment wherein hot melt adhesive 22, for example from a melt stick of hot melt adhesive, is used to make a repair to a holiday 14 in a coating 13b on a pipe 11b. Sufficient of the adhesive is applied to fill the holiday and to form an area 22a bonded on the upper surface of the coating 13b around the margin of the holiday 14. In order to stabilize the adhesive 22 and area 22a, especially against displacement laterally of the coating 13b as a result of soil stress, a deposit 23 of epoxy or other cured thermoset resin is formed as described in more detail above in connection with FIGS. 3 and 5. The deposit extends over the area 22a and overlaps on the coating 13b around the margins of the area 13b and is bonded securely to these substrates.

Figure 7:
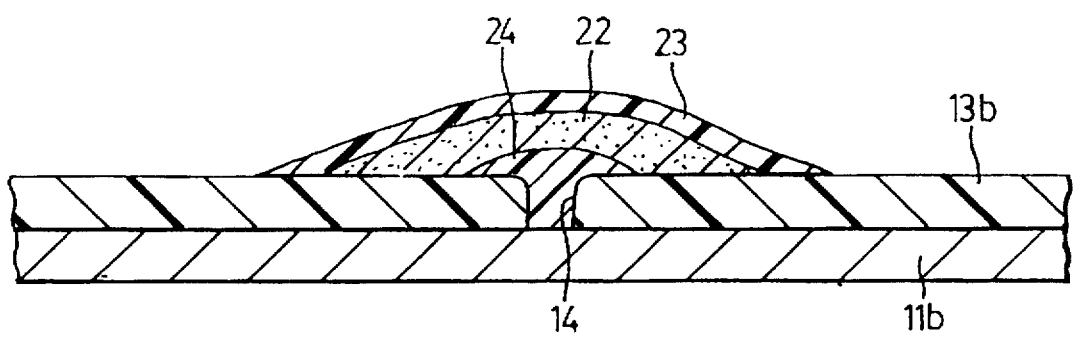
FIG. 7 is a cross-sectional view similar to FIG. 6 showing a further form of repair formed in accordance with the invention.

FIG. 7 shows a modification of the covering structure of FIG. 6 wherein, instead of applying the hot melt adhesive 22 direct on the steel of the pipe 11b exposed at the holiday 14, the exposed steel is first coated with a layer 24 of a curable liquid epoxy resin which is usually allowed to at least partially harden or cure before application of the melt-on repair adhesive 22. The repair adhesive is stabilized with an overcoating 23 of cured epoxy or other thermoset resin formed as described above.

We claim:

1. A method of improving the stability of a covering on an elongated substrate having a substrate outer surface and extending along an axis and being subject to movement in the direction of said axis relative to soil within which the substrate extends, said covering having edges with faces extending transverse to said axis and having a covering outer surface, said method comprising the steps of applying at least over said edges and said substrate and covering outer surfaces a curable deposit of thermoset resin, and curing and bonding said thermoset resin to at least said edges and to the substrate and covering outer surface to provide the covering with increased stability against displacement relative to the substrate in the direction of said axis.

2. A method as claimed in claim 1 wherein the second covering has a functional coating on an underside applied on the first covering.

3. A method as claimed in claim 2 wherein the functional coating is a mastic, hot melt adhesive, a hybrid thereof, or a pressure sensitive adhesive.

4. A method as claimed in claim 3 wherein the functional coating is a mastic.

5. A method as claimed in claim 1 wherein said deposit has a flexural modulus of about $10^3$ to about $10^7$ psi.

6. A method as claimed in claim 5 wherein said flexural modulus is about $10^4$ to about $10^6$ psi.

7. A method as claimed in claim 6 wherein said flexural modulus is about $5 \times 10^4$ to about $7.5 \times 10^5$ psi.

8. A method as claimed in claim 1 wherein said deposit has a shear strength about 250 psi to about 20,000 psi.

9. A method as claimed in claim 8 wherein said shear strength is about 500 psi to about 10,000 psi.

10. A method as claimed in claim 9 wherein said shear strength is about 1000 psi to about 5000 psi.

11. A method as claimed in claim 1 wherein said cured thermoset deposit comprises an epoxy resin, a polyester resin, a polyurethane resin, a silicone resin or a polyurea resin.

12. A method as claimed in claim 1 wherein said second covering comprises sheet material and said covering has a thickness around the margins of the covering at least equal to the thickness of the sheet material.

13. A method as claimed in claim 1 wherein said second covering comprises a sleeve or a patch.

14. A method as claimed in claim 1 wherein said deposit is applied as a fibrous tape impregnated with a curable resin composition.

15. A method as claimed in claim 1 wherein said second covering comprises an adhesive superimposed on and bonding to said first covering.

16. A method as claimed in claim 15 wherein said second covering comprises a hot melt adhesive.

17. A method as claimed in claim 16 wherein said second covering comprises an auxiliary cured thermoset deposit and said hot melt adhesive deposit applied over said auxiliary deposit.

18. A method as claimed in claim 17 wherein said auxiliary deposit fills an aperture in said first covering.

19. A method as claimed in claim 15 wherein said deposit has a flexural modulus of about $10^3$ to about $10^7$ psi.

20. A method as claimed in claim 19 wherein said flexural modulus is about $10^4$ to about $10^6$ psi.

21. A method as claimed in claim 20 wherein said flexural modulus is about $5 \times 10^4$ to about $7.5 \times 10^5$ psi.

22. A method as claimed in claim 15 wherein said deposit has a shear strength about 250 psi to about 20,000 psi.

23. A method as claimed in claim 22 wherein said shear strength is about 500 psi to about 10,000 psi.

24. A method as claimed in claim 23 wherein said shear strength is about 1000 psi to about 5000 psi.

25. A method as claimed in claim 15 wherein said cured thermoset deposit comprises an epoxy resin, a polyester resin, a polyurethane resin, a silicone resin or a polyurea resin.

26. A method as claimed in claim 15 wherein said deposit is applied as a fibrous tape impregnated with a curable resin composition.

27. An article having a covering providing increased stability, comprising an elongate tubular article extending along a longitudinal axis and having an outer surface having a circumferential covering thereon, said covering having an outer surface and extending in the direction of said longitudinal axis, said covering having edges with faces extending transverse to said axis, and a cured deposit of thermoset resin applied at least over said edges of the covering and bonding to said outer surfaces of said covering and of said article and providing the covering with increased stability against displacement with respect to said article in the direction of said axis.

28. An article as claimed in claim 27 wherein said elongate tubular article is rigid.

29. An article as claimed in claim 27 wherein said elongate article is a rigid pipe.

* * * * *